INVENTOR
ARTHUR J. LEWIS
BY Scrivener + Parker
ATTORNEYS

INVENTOR
ARTHUR J. LEWIS
BY Scrivener & Parker
ATTORNEYS

United States Patent Office 2,778,467
Patented Jan. 22, 1957

2,778,467

RATCHET DRIVE MECHANISM

Arthur J. Lewis, Stratford, Conn., assignor to The Baird Machine Company, Stratford, Conn., a corporation of Connecticut Application March 11, 1954, Serial No. 415,516

8 Claims. (Cl. 192—50)

This invention relates to a reversing ratchet drive mechanism, and most particularly to a differential ratchet drive mechanism adapted for use on small tractors and the like, where the cost of a conventional differential is prohibitive.

Some sort of a differential mechanism is extremely desirable on all tractors, but in view of the cost of a conventional differential it has been customary in the past to use ratchet mechanisms, some of these mechanisms being suitable for effecting a drive in only one direction, while others are arranged to automatically effect either a forward or reverse driving action. Most of the ratchet drives of the prior art, however, allow the tractor to free wheel on a down grade, and this has resulted in accidents due to the driver losing control of the tractor.

It is accordingly one of the objects of the present invention to provide a differential reversing ratchet drive for the rear wheels of this type of tractor which will not only permit forward and reverse drive, but which will also permit the tractor to drive the engine when the tractor is on a down grade in order to obtain the benefit of the braking action exerted by the engine.

A further object of the invention is to provide drive mechanism of the above type which is of simple construction involving a minimum number of parts, and which will operate automatically without attention by the driver.

Yet another object is to provide a ratchet drive for a wheel which will permit the wheel to normally overrun the drive shaft but will prevent such overrunning when the speed differential exceeds a predetermined value.

These and other novel features and objects of the invention will be more readily understood when considered in the light of the accompanying drawings and the following description. In the drawings, wherein similar reference characters refer to similar parts throughout the several views.

Figure 1:
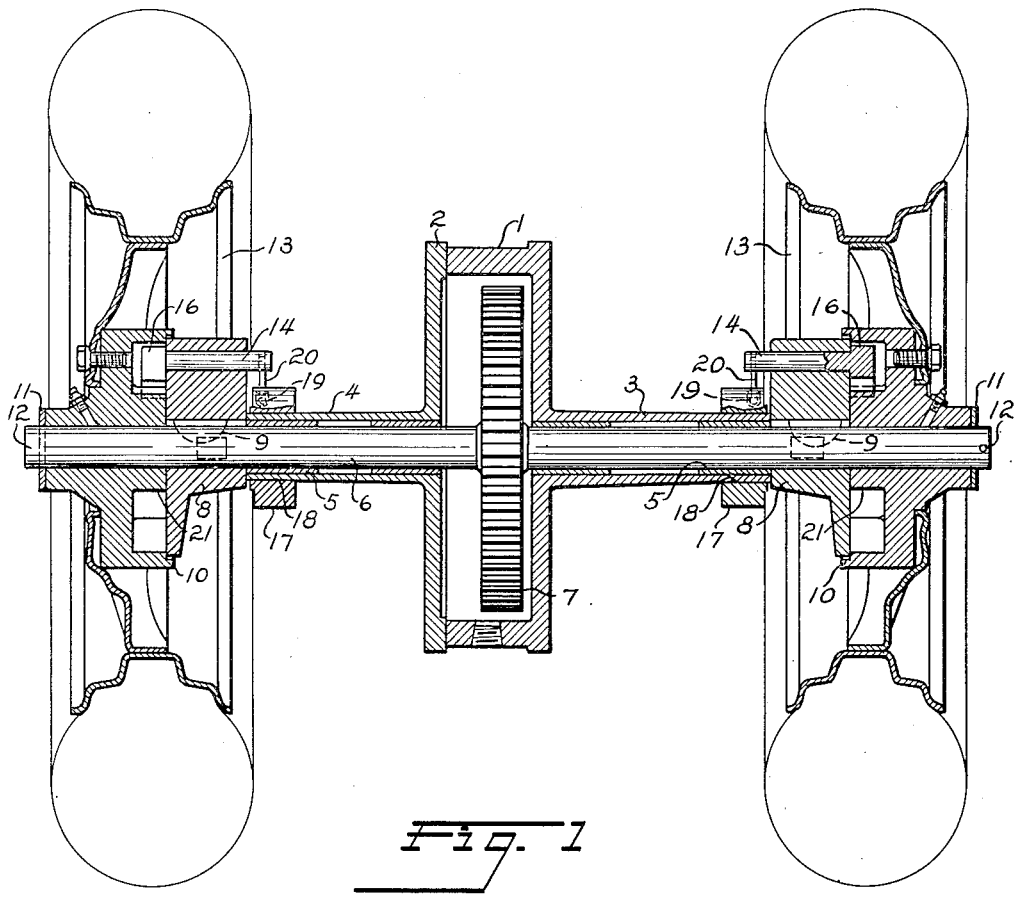
Fig. 1 is a sectional view of the rear axle of a tractor equipped with the novel ratchet drive mechanism.

Referring more particularly to Fig. 1, the tractor axle includes a pair of housing members 1 and 2 having axle tubes or supports 3 and 4 extending respectively to the right and to the left and provided with bearings 5 supporting a driven axle shaft 6 having a main drive gear 7 secured thereto as shown. Since the construction is identical on both ends of the axle mechanism, the mechanism on the right hand end only will be described, and includes a block 8 secured to the shaft for rotation therewith by means of a key 9, and a wheel hub 10 rotatably mounted on the shaft and maintained thereon by means of a thrust washer 11 and a pin 12, the hub 10 being adapted to carry a wheel 13 secured thereto in the conventional manner. A pawl shaft 14 is rotatably mounted in a bore 15 of the block, and is provided on its right end with a pawl 16 adapted to rotate with the shaft and which is preferably integral therewith. Pawl biasing means are provided, and may be of the friction type wherein a friction collar 17 having a bore 18 is rotatably mounted on the right end of the axle tube 3 in frictional engagement therewith as shown, and is provided with a bore 19 adapted to loosely receive the lower end of an actuating pin 20 which is secured to the shaft 14 for rotation therewith. When the drive shaft 6 is rotated in the axle housing by means of the gear 7 which is connected to the tractor engine through suitable transmission mechanism, not shown, the block 8 also rotates with the shaft carrying the pawl shaft 14 and the pawl 16 around with it, while the wheel hub 10 is free to rotate on the drive shaft except as it may be connected thereto by the pawl 16 in a manner to be described more fully hereinafter. During such rotation of the shaft, the pin 20, due to its engagement with the friction ring 17 in the bore or socket 19, tends to rotate the friction ring in the direction of rotation of the drive shaft and block, with the result that when the drive shaft is rotating, the friction ring tends to lag behind and thus rotate the pawl shaft 14 in the same direction as the shaft 6 at all times.

Figure 2:
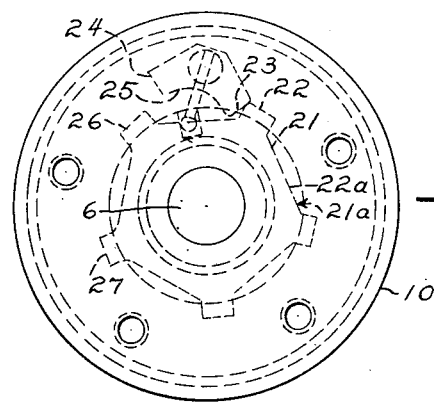
Fig. 2 is an end view of the ratchet mechanism taken from the right side of Fig. 1, and showing portions of the mechanism in dotted lines.

The inner portion of the hub has a ratchet wheel portion 21 shown more in detail in Fig. 2, the ratchet wheel portion being provided with a ratchet surface 21a having spaced teeth 22 with recesses 22a therebetween and adapted to be engaged for drive in a clockwise direction, by pawl tooth 23, and for drive in a counterclockwise direction, as viewed in Fig. 2, by pawl tooth 24, spaced as shown from the pawl tooth 23. The pawl on the lower side is provided with an arcuate cam surface 25 adapted to be engaged by the teeth 22 as will be more fully described hereinafter, for the purpose of reversing the position of the pawl on overrunning movement of the ratchet wheel portion of the hub with respect to the drive shaft.

When the shaft 3 is rotated in a clockwise direction to drive the tractor forward, the block 8 and the pawl shaft 14 will move with it in the same direction, and since the pawl shaft is connected to the friction ring 17 by means of the pin 20, the drag of the friction ring on the axle tube will cause rotation of the pawl shaft 14 in a clockwise direction to bias the tooth 23 into engagement with the ratchet surface until it is in a position to effect driving engagement with one of the ratchet teeth 22, whereupon the pin will operate to rotate the friction ring 17 on the axle tube in a clockwise direction, the friction ring continuing to maintain a drag on the pawl mechanism which will tend to keep the pawl in driving engagement even though the ratchet wheel may tend to run ahead of the shaft 6.

If, with the parts in the position shown, the drive shaft is rotated in a counterclockwise direction to drive the tractor backwards, the block and pawl assembly will then also move bodily with the shaft in a counterclockwise direction, and the friction ring, due to its engagement with the pin 20, will cause rotation of the pawl shaft 14 in a counterclockwise direction also until the tooth 24 of the pawl is in a position for driving engagement with one of the teeth 22 on the ratchet wheel. In this respect, the operation of the ratchet driving mechanism is substantially the same as that set forth in my Patent No. 2,531,-819, dated November 28, 1950, the present mechanism being an improvement over the mechanism shown in that patent, as will be more fully pointed out hereinafter.

As heretofore stated, it is desirable that the ratchet drive mechanism be so constituted as to prevent free wheeling of the tractor on a down grade when the wheels of the tractor tend to overrun the drive shaft, and the pawl and ratchet wheel mechanism of the present invention is so constituted as to accomplish this desirable end. Referring again to Fig. 2, it will be noted that the ratchet wheel teeth, recesses pawl teeth, and the pawl shaft are so positioned and proportioned with respect to each other that the pawl has no position in which both of the pawl teeth 23 and 24 are entirely out of engagement with the teeth of the ratchet wheel, at the same time the construction being such that when the pawl is in mid-position, the inner ends of the pawl teeth 23 and 24 are both in recesses 22a between the ratchet teeth 22 of the ratchet wheel. Thus, on overrunning movement of the ratchet wheel with respect to the axle shaft with the parts in the position shown, the cam surface 25 on the pawl is engaged by a following ratchet wheel tooth and the pawl is moved in a counterclockwise direction to place the pawl tooth 24 in a position between following or trailing ratchet wheel teeth 26 and 27 and ready to engage the leading face of ratchet wheel tooth 27 to prevent further overrunning movement of the ratchet wheel with respect to the shaft 3. However, the spacings of the pawl teeth with respect to the ratchet wheel teeth are such that when the front of the pawl tooth 23 is just ready to fall off the trailing edge of the tooth 26 and enter the space between teeth 26 and 27, the driving face of the pawl tooth 25 is spaced from the leading face of the tooth 27. This spacing is an essential feature of the invention that insures that while the desirable differential action will be obtained in the normal manner when the tractor is driven around the corner either to the right or left, allowing the outer wheel of the tractor to overrun the drive shaft, the pawls are reversed automatically to permit the tractor wheels to drive the drive shaft and engine through the ratchet wheels and pawls when the speed differential of the wheel and shaft 6 exceed a predetermined value, as occurs when the tractor goes down a hill with the engine slowed down or idling.

While it might appear that the operation of the pawl on overrunning movement of the ratchet wheel would be the same regardless of whether this overrunning movement occurred due to the tractor turning a corner or due to the tractor going down hill, this selective operation of the pawl mechanism is readily understood when it is considered that in going around a corner the speed differential between the overrunning outer drive wheel and ratchet wheel and the shaft is extremely small as compared with the differential which occurs when the tractor is going down a hill. When the vehicle turns a corner to the left for example, with the ratchet wheel moving clockwise ahead of the drive shaft very slowly but with the drive shaft still rotating in a clockwise direction at a slightly lesser speed, the lower end of the tooth 23 will simply cam over the following tooth 26, as viewed in Fig. 2, and since the action of the friction ring 17 under this condition is at all times tending to rotate the pawl and pawl shaft in a clockwise direction, the right end of the pawl will simply follow the contour of the ratchet surface and cam over the ratchet wheel teeth in contact therewith somewhat like an escapement, and the rear pawl tooth 24 will be moved out of the path of the following ratchet wheel tooth 27 by the action of the friction ring before the tooth has an opportunity to engage the pawl tooth in driving relationship, the spacing between the pawl teeth with respect to the spacing between the ratchet wheel teeth and the very small speed differential permitting this action to occur. Now, if we materially increase the speed of rotation of the wheel relative to the drive shaft in clockwise direction, the force exerted by the friction ring acting to keep the pawl tooth 23 in engagement with the outer periphery of the ratchet wheel is substantially unchanged, but the time available for the return of the tooth 24 to the position shown due to the action of the friction ring is much shorter, and if the tooth spacings of the pawl and ratchet wheel and the positioning of the pawl shaft with respect to the diameter of the ratchet wheel are properly chosen, the pawl will, when the speed of the wheel exceeds the speed of the shaft 6 by an appreciable amount when the tractor is rolling down hill, reverse its driving position to effect engagement with the tooth 27, and the corresponding tooth of the driving pawl on the left side of the vehicle will likewise engage with the leading face of a following tooth of the left ratchet wheel, whereupon the wheels of the tractor will drive the engine and permit the operator to avail himself of the braking power exerted by the engine.

From the foregoing it will be apparent that the above described selective action of the pawl is dependent on a time element, and that this time element is primarily dependent on the relative spacings of the pawl teeth and the ratchet wheel teeth. Since the force exerted by the friction ring to rotate the pawl is substantially constant regardless of the speed of rotation of the axle shaft, it is apparent that, disregarding inertia effects, the time required for the friction ring to operate the pawl in the manner above described will be substantially the same regardless of the speed of the vehicle. Where the speed differential between the axle shaft and the ratchet wheel is appreciable it seems probable that when the pawl is rotated in a counterclockwise direction on the block by the following ratchet tooth as above described, it is kicked out of engagement with the ratchet wheel, and the friction ring may be kicked in a clockwise direction. This would give an inertia effect tending to further delay the return of the pawl to the position shown, and in some instances might assist in preventing free wheeling of the tractor on a down grade. Stating the operation in different language, if the speed differential of the drive shaft and ratchet wheels exceeds a certain critical value, the pawl does not have time to return to the position shown in the drawing so that a following ratchet tooth passes under it, and consequently the pawl engages the following tooth for drive in the other direction. The construction is such that the pawl teeth engage the ratchet teeth at a locking angle, and consequently the driving force exerted by the ratchet wheel on the pawl in the reverse direction is sufficient to maintain the pawl in reverse engagement with the ratchet wheel, regardless of the force exerted thereafter by the friction ring to rotate the pawl back towards its original position.

Figure 3:
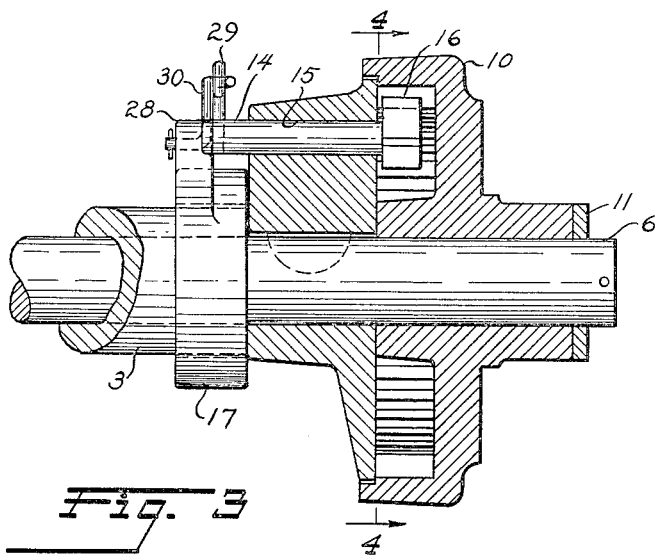
Fig. 3 is a view, partially in section, showing a modified form of the ratchet drive mechanism.
Figure 4:
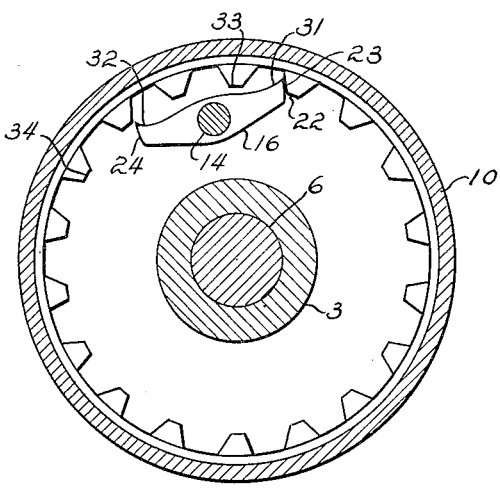
Fig. 4 is a partial view of the mechanism of Fig. 3 taken along lines 4—4 of that figure.
Figure 5:
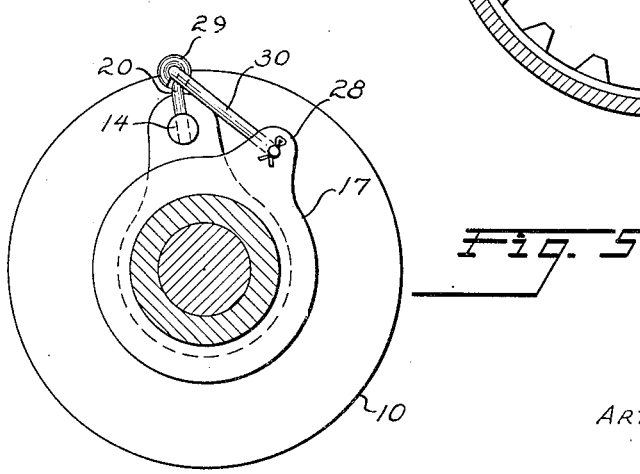
Fig. 5 is a view of the ratchet operating mechanism of Fig. 3 taken from the left in that figure.

Referring now to Figs. 3, 4 and 5 of the drawings, a modification of the invention is shown wherein improved operation is obtained by rearrangement of parts. In this embodiment, as shown particularly in Figs. 3 and 4, the ratchet wheel is in the form of an internal gear, and the teeth 23 and 24 of the pawl, which is mounted in the same manner as that shown in Fig. 1 on the axle driven block 8, are arranged for engagement with the internal teeth of the ratchet wheel, the arrangement being such that with the pawl in mid-position the outer edges of the pawl teeth fall outside of a circle passing through the inner ends of the ratchet wheel teeth.

In order to insure the proper pawl action in connection with this mechanism, however, it is necessary to reverse the driving connection between the friction wheel ring 17 and the pawl shaft, and to this end the friction ring is provided with a lever arm 28, while the pawl shaft operating pin 20 is arranged to extend outwardly instead of inwardly from the pawl shaft, and is provided at its outer end with an eye 29, the eye being connected with the lever arm 28 of the friction ring by means of a suitable connecting rod 30, suitably connected as shown to the friction ring arm and to the eye 29 on the pin 20.

The operation of the mechanism except for the reversal of parts, is substantially identical to that described heretofore in connection with the mechanism shown in Figs. 1 and 2, clockwise rotation of the drive shaft 6 causing rotation of the block and the pawl carried thereby bodily in the same direction. As the block rotates, the friction ring lags behind the block, and by virtue of its connection with the pawl shaft through connecting rod 30, tends to rotate the pawl shaft in a direction opposite from the direction of rotation on the drive shaft 6, and moves the pawl to the position shown in Fig. 4 for engagement of tooth 23 with one of the ratchet teeth 22. As indicated in Fig. 4, the spacing of the pawl teeth relative to the spacing of the ratchet wheel teeth is such that on overrunning movement of the ratchet wheel relative to the axle shaft in a clockwise direction, for example, the pawl is cammed back and forth by the engagement of the ratchet wheel teeth with pawl cam surface 31, and when the tooth 23 is just leaving the trailing edge of ratchet wheel tooth 33, the pawl tooth 24 is in a position to engage the leading face of ratchet tooth 34, but is spaced therefrom sufficiently to prevent such engagement unless the speed differential between the ratchet wheel and the axle shaft exceeds a predetermined value as heretofore explained. If the differential speed is less than said predetermined value, the friction ring will have pawl tooth 24 out of the way before ratchet tooth 34 can engage with it.

Although slightly more mechanism is required to effect an operating connection between the friction ring and the pawl shaft, this modification of the invention has distinct advantages in view of the fact that a much larger number of ratchet wheel teeth can be utilized without increasing the overall outside dimension of the ratchet wheel, the result being that when the operator wishes to move the tractor backward, after moving in a forward direction, less movement of the axle shaft in the reverse direction is required to reverse the pawls and effect a drive in the reverse direction, thus resulting in less lost motion between the axle shaft and ratchet wheel during this operation and a resulting decrease in the wear and tear on the mechanism as well as on the driver. Also, when the tractor is used on a wet lawn, for example, there is less tendency for the wheels to slide when the tractor is reversed, and consequently less tendency for the tractor to damage the lawn. The principle of operation in the embodiment disclosed in Figs. 3, 4 and 5, is identical however with that already described in connection with Figures 1 and 2.

The speed differential between the wheels of a tractor axle when rounding a corner is dependent on the tread of the tractor and on the turning radius, and is normally very small compared to the speed differential that occurs if the tractor is free-wheeling on a hill. Due to this large difference in speed differentials under the two conditions of operation, the pawl and ratchet can readily be designed for the automatic selective operation described, which effects free-wheeling of the outer wheel when turning a corner, and which causes the wheels to drive the engine when descending a grade. It is also pointed out that the same mechanism can be used to drive a single wheel in cases where it is desired to have a positive drive in one direction or the other which will permit the wheel to overrun the drive shaft until the wheel speed exceeds the drive shaft speed by a predetermined value, and which will prevent the wheel from continuing to overrun the drive shaft when the speed difference exceeds said predetermined value.

Although two arrangements of the mechanism have been illustrated and described in detail, both operating in the same manner and with essentially the same mechanism, it is to be noted that an essential feature of the invention resides in the actuation of the pawl by both the friction member or biasing means and the ratchet teeth to reverse it from one driving position to the other. The friction member acts to continuously bias the forward or reverse drive pawl tooth into engagement with the ratchet surface during rotation of the drive shaft in a corresponding direction, and to reverse the pawl on reversal of the drive shaft, while the ratchet teeth and cam means associated with the pawl are operative to overcome the biasing action of the friction member and reverse the driving position of the pawl whenever the wheel overruns the drive shaft. Although the mechanism shown is simple and efficient and well suited to the intended purpose, it will be understood that other pawl and pawl camming mechanisms as well as other pawl biasing means may be utilized without departing from the spirit of the invention.

Although two embodiments of the invention have been described and illustrated herein with considerable particularity, it is to be expressly understood that various changes and modifications may be made therein without departing from the spirit of the invention, as is well understood by those skilled in the art. Reference will, therefore, be had to the appended claims for a definition of the limits of the invention.

What is claimed is:

1. An overrunning differential ratchet drive for a vehicle including a drive shaft support, a drive shaft rotatably mounted on the support, laterally spaced wheels rotatably mounted on the drive shaft, and a ratchet drive between each wheel and the shaft including a ratchet portion on the wheel having a ratchet surface provided with a series of spaced teeth and recesses therebetween spaced outwardly from the shaft and arranged concentrically with respect thereto, a block mounted on the shaft for rotation therewith adjacent the wheel, a driving pawl movably mounted on the block having forward and reverse driving positions thereon and provided with a pair of spaced forward and reverse driving teeth selectively engageable with the ratchet teeth, means operable on rotation of the shaft in forward or reverse direction to move the pawl to bias the corresponding driving tooth into engagement with said ratchet surface including a friction member mounted for rotation on the support and a pawl operating connection between said friction member and pawl, and cam means on the pawl engageable by the ratchet teeth on overrunning rotation of the wheel relative to the shaft in either direction for reversing the driving position of the pawl, the spacing and positioning of the pawl teeth relative to the ratchet surface being such that with the pawl in said reversed position with one pawl tooth leaving the trailing edge of a ratchet tooth, the other pawl tooth is positioned in one of said recesses for engagement with but spaced from the leading face of another ratchet tooth.

2. Drive mechanism for a wheel comprising a support, a drive shaft rotatably mounted on the support, a wheel rotatably mounted on the drive shaft, and means for selectively connecting said shaft and wheel for driving the latter in either direction and operable to prevent overrunning of the wheel on the shaft in either direction when the speed of rotation of the wheel exceeds that of the shaft by a predetermined amount and operable to permit such overrunning when the speed differential of the wheel and shaft is less than said predetermined amount, said means including a ratchet portion on the wheel having a ratchet surface provided with a series of spaced teeth and recesses therebetween spaced outwardly from the shaft and arranged concentrically with respect thereto, a block mounted on the shaft for rotation therewith adjacent the wheel, a driving pawl movably mounted on the block having forward and reverse driving positions thereon and provided with a pair of spaced forward and reverse driving teeth selectively engageable with the ratchet teeth, means operable on rotation of the shaft in forward or reverse direction to move the pawl to bias the corresponding pawl driving tooth into engagement with said ratchet surface including a friction member mounted for rotation on the support and a pawl operating connection between said friction member and pawl, and cam means on the pawl engageable by the ratchet teeth on overrunning rotation of the wheel relative to the shaft in either direction for disengaging said driving tooth from driving engagement with the ratchet and for reversing the driving position of the pawl, the spacing and positioning of the pawl teeth relative to the ratchet surface being such that with the pawl in said reversed position the other of said pawl teeth is positioned for engagement with a following ratchet tooth but spaced therefrom.

3. Vehicle drive mechanism as set forth in claim 1, wherein the spacing between said other pawl tooth and the leading face of said another ratchet tooth with the pawl in said reversed position is so related to the distance between said wheels and the turning radius of the vehicle as to insure that when the vehicle is turning, said pawl will be moved by said biasing means to move said other pawl tooth out of ratchet tooth engaging position prior to engagement therewith by the leading face of said another ratchet tooth.

4. Vehicle drive mechanism as set forth in claim 1, wherein said ratchet portion is in the form of an internal gear, the pawl is mounted for rotation on the block about an axis substantially parallel to the drive shaft axis, and the pawl operating connection between the friction member and pawl is so arranged as to bias the pawl for rotation on the block in the opposite direction from the drive shaft rotation.

5. An overrunning differential ratchet drive for a vehicle including a drive shaft support, a drive shaft rotatably mounted on the support, laterally spaced wheels rotatably mounted on the drive shaft, and a ratchet drive between each wheel and the shaft including a ratchet portion on the wheel having a ratchet surface provided with a series of spaced teeth and recesses therebetween spaced outwardly from the shaft and arranged concentrically with respect thereto, a block mounted on the shaft for rotation therewith adjacent the wheel, a driving pawl mounted on the block movable between forward and reverse driving positions thereon and provided with a pair of spaced forward and reverse driving teeth selectively engageable with the ratchet teeth, means operable on rotation of the shaft in forward or reverse direction to move the pawl to bias the corresponding driving tooth into engagement with said ratchet surface including a friction member mounted for rotation on the support and a pawl operating connection between said friction member and pawl, and cam means associated with the pawl engageable by the ratchet teeth on overrunning rotation of the wheel relative to the shaft in either direction for reversing the driving position of the pawl, the ratchet teeth, recesses, and pawl teeth being so dimensioned and arranged relative to each other that with the pawl positioned midway between forward and reverse positions both pawl teeth are positioned in ratchet surface recesses and the spacing between the driving faces of the pawl surfaces is appreciably less than that between the ratchet tooth faces adjacent thereto.

6. Drive mechanism for a wheel comprising a support, a drive shaft rotatably mounted on the support, a wheel rotatably mounted on the drive shaft, and means for selectively connecting said shaft and wheel for driving the latter in either direction operable to prevent overrunning of the wheel on the shaft in either direction when the speed of rotation of the wheel exceeds that of the shaft by a predetermined amount and operable to permit such overrunning when the speed differential of the wheel and shaft is less than said predetermined amount, said means including a ratchet portion on the wheel having a ratchet surface provided with a series of spaced teeth and recesses therebetween spaced outwardly from the shaft and arranged concentrically with respect thereto, a block mounted on the shaft for rotation therewith adjacent the wheel, movable driving pawl means on the block including forward and reverse pawl teeth selectively engageable with the ratchet teeth, means operable on rotation of the shaft in forward or reverse direction for operating the pawl means to bias the corresponding pawl tooth into engagement with the ratchet surface including a friction member mounted for rotation on the support and an operating connection between the friction member and pawl means, and cam means associated with said pawl means engageable with the ratchet teeth on overrunning rotation of the wheel relative to the shaft in either direction for disengaging said driving pawl tooth from driving engagement with the ratchet and for moving the other of said pawl teeth into ratchet tooth engaging position, the spacing and arrangement of the ratchet teeth, recesses, and pawl teeth being such that said other pawl tooth is in a recess with its driving face spaced from the leading face of a following ratchet tooth when said disengaged pawl tooth is leaving the trailing edge of a leading ratchet tooth.

7. Drive mechanism for a wheel comprising a support, a drive shaft rotatably mounted on the support, a wheel rotatably mounted on the drive shaft, and ratchet drive mechanism associated with the shaft and wheel for normally transmitting driving force from the shaft to the wheel for rotation thereof in a predetermined direction and for permitting the wheel to overrun the shaft and operative when the speed of the wheel in said direction exceeds that of the shaft by a predetermined amount for transmitting driving force from the wheel to the shaft in said one direction, said ratchet mechanism including a ratchet portion on the wheel having a ratchet surface provided with a series of spaced ratchet teeth and recesses therebetween spaced outwardly from and arranged concentrically with respect thereto, a block mounted on the shaft for rotation therewith adjacent the wheel, a driving pawl movably mounted on said block having a pawl tooth engageable with the ratchet teeth for transmitting driving force from the shaft to the wheel in said one direction and a second pawl tooth spaced therefrom and engageable with the ratchet teeth to transmit driving force from the wheel to the shaft to drive the latter in said one direction, biasing means associated with the pawl for moving the latter to urge the first named pawl tooth into engagement with said ratchet surface, and cam means associated with the pawl and engageable by a ratchet tooth on overrunning movement of the wheel on the shaft in said one direction to disengage the first named pawl tooth from a ratchet tooth and position said second pawl tooth for driving engagement with the leading face of a following ratchet tooth, the spacing and positioning of the pawl teeth relative to the ratchet surface being such that with the first named pawl tooth just leaving the trailing edge of a ratchet tooth, the driving face of the second pawl tooth is positioned in one of said recesses for engagement with but spaced from the leading face of a following ratchet tooth.

8. Ratchet drive mechanism for connecting a shaft rotatably mounted on a support and a wheel rotatably mounted on the shaft, said mechanism including a ratchet surface on the wheel having ratchet teeth and recesses therebetween arranged concentrically with respect to the shaft axis, a block carried by the shaft for rotation therewith, driving pawl means carried by and movable on the block including spaced forward and reverse pawl teeth selectively engageable with the ratchet teeth, and means for selectively engaging one or the other of said pawl teeth with the ratchet teeth including pawl biasing means interconnected between said support and pawl means operable on forward or reverse rotation of the shaft to bias the corresponding pawl tooth into engagement with said ratchet surface and positive pawl tooth reversing means for reversing the positions of the pawl teeth on overrunning rotation of the wheel on the shaft including cam means associated with the pawl means and engageable by the ratchet teeth for effecting said pawl tooth reversal, said ratchet teeth, recesses, pawl teeth, and cam means being so constituted and dimensioned as to positively position one or the other of said pawl teeth for engagement with an adjacent ratchet tooth at all times.

References Cited in the file of this patent
UNITED STATES PATENTS

| | | |
|---|---|---|
| 1,406,211 | Myers | Feb. 14, 1922 |
| 1,469,700 | Sheldon | Oct. 2, 1923 |
| 2,531,819 | Lewis | Nov. 28, 1950 |